United States Patent [19]

Burk, Jr. et al.

[11] 4,234,452

[45] Nov. 18, 1980

[54] HIGH PRESSURE OXYGEN AQUEOUS PHASE CATALYST DEMETALLIZATION

[75] Inventors: Emmett H. Burk, Jr., Glenwood; Jin S. Yoo, Flossmorr; Jui-Yuan Sun, South Holland; John A. Karch, Chicago, all of Ill.

[73] Assignee: Atlantic Richfield Company, Philadelphia, Pa.

[21] Appl. No.: 23,559

[22] Filed: Mar. 26, 1979

[51] Int. Cl.$^3$ .................. B01J 29/38; B01J 21/20; C10G 11/05; C10G 11/04
[52] U.S. Cl. .................. 252/419; 208/113; 208/120; 252/412; 252/413; 252/416; 252/420
[58] Field of Search .................. 252/416, 419, 411 S, 252/413, 420, 412; 208/120, 113

[56] References Cited

U.S. PATENT DOCUMENTS

| | | | |
|---|---|---|---|
| 3,147,228 | 9/1964 | Erickson | 252/412 |
| 3,150,103 | 9/1964 | Anderson | 252/412 |
| 3,557,019 | 1/1971 | Van Driesen | 252/420 |
| 4,101,444 | 7/1978 | Burk et al. | 252/416 |
| 4,102,811 | 7/1978 | Burk et al. | 252/416 |

*Primary Examiner*—P. E. Konopka
*Attorney, Agent, or Firm*—Stanley M. Welsh

[57] ABSTRACT

An improved demetallization process is disclosed comprising high pressure aqueous phase oxidation of a catalyst contaminated with a metal such as nickel, vanadium, copper and/or iron. The metal-contaminated catalyst can be oxidized in an aqueous phase at high pressure either before regeneration or subsequent to regeneration. Optionally, an oxidative and reductive wash can also be employed.

8 Claims, No Drawings

HIGH PRESSURE OXYGEN AQUEOUS PHASE CATALYST DEMETALLIZATION

BACKGROUND OF THE INVENTION

1. Field of the Invention

The field of this invention relates to demetallization of metal contaminated catalysts. More particularly, this invention relates to a high pressure aqueous phase oxidation process to aid removal of metal contaminants from hydrocarbon conversion catalysts.

2. Prior Art

That conversion catalysts become contaminated or poisoned by absorbing or otherwise reacting with metals within a hydrocarbon feed is generally recognized. In order to maintain or recover catalytic activity of a catalyst the affect of metal poisons must be lessened, e.g. by removal of such metals from the catalyst. It is important that during the removal process of these metals that the catalyst itself not be adversely effected.

Erickson, U.S. Pat. No. 3,122,497 (1964) discloses the removal of metal contaminants from a cracking catalyst by the process of regenerating an aged catalyst, sulfiding the regenerated catalyst, and oxidizing to form water dispersible metal salts. Some of the oxidation methods disclosed are gas phase oxidations employing gaseous oxygen or mixtures of gaseous oxygen with inert gases such as nitrogen at temperatures from room temperature to 1300° F. (704° C.). Liquid phase oxidation employing dilute hydrogen peroxide or hypochlorous acid water solutions are also disclosed.

J. P. Connor, Jr. et al U.S. Pat. No. 3,123,548 (1964) discloses a method comprising separating a cracking catalyst from a hydrocracking reaction zone, contacting at a temperature from about 900° F. to 1000° F. (480° C. to 538° C.) the catalyst with molecular oxygen in a temperature range of from about 350° to 1100° F. (177° to 593° C.) for at least thirty minutes, contacting the oxygen-treated catalyst with a cation exchange resin in an aqueous medium at a selected pH so as to remove the metal contaminants and returning the catalyst to the hydrocracking reaction zone. The pH control of the medium in which a cation resin is employed is important to the efficiency of the removal of metal poisons within the catalyst.

Erickson et al. U.S. Pat. No. 3,147,209 (1964) discloses a method for demetalizing a silica-based cracking catalyst by a process comprising regenerating an aged catalyst to remove carbonaceous deposits, sulfiding the regenerated catalyst, contacting the sulfided catalyst at moderately elevated temperatures with an oxygen-containing gas-steam mixture to convert the metal sulfides to sulfates or other water-soluble or dispersible materials which are subsequently removed in a washing operation employing an aqueous medium. The sulfided catalyst is oxidized with a mixture of steam and molecular oxygen-containing gas at a temperature in the range 200° to 1150° F. (93° to 621° C.).

Schwartz U.S. Pat. No. 3,148,155 (1964) discloses an aqueous reductive wash of a regenerated, aged catalyst to remove metal contaminants such as nickel, vanadium and/or copper.

Anderson, U.S. Pat. No. 3,150,103 (1964) discloses an aqueous phase oxidation of a slurry comprising a sulfided and regenerated catalyst. The aqueous phase is disclosed to contain optionally ethylenediamine tetraacetic acid and ammonium hydroxide.

An aqueous phase oxidation of a sulfided catalyst which had previously been regenerated by means of an oxidative burn-off are disclosed in the following U.S. Patents expressly incorporated herein by reference: U.S. Pat. Nos. 2,764,557 (1956), 3,122,497 (1964), 3,146,188 (1964), 3,150,103 (1964), 3,150,072 (1964), 3,168,462 (1965), 3,182,011 (1965), 3,201,341 (1965), 3,216,951 (1965), 3,222,293 (1965), 3,252,918 (1966), 3,255,102 (1966), 3,379,639 (1968), 4,101,444 (1978) and 4,102,811 (1978). The use of aerated aqueous phase solutions which optionally are either acidic or contain a chelating agent are disclosed. However, the criticality of the partial pressure of oxygen is not recognized and is expressly taught away from. There is an express teaching that although higher oxidative partial pressures in an aqueous phase arising at temperatures much above 212° F. (100° C.) can be used, the benefits from using such higher partial pressures is alleged not to exist and the apparatus costs necessary to be able to utilize such higher oxidative partial pressures is alleged to be neither necessary nor desirable.

Specifically, all of the above-cited patents disclosing aqueous phase oxidation of a sulfided catalyst contain statements to the effect that the use of superatmospheric pressures have been allegedly found not to be necessary in order to perform the oxidation. Accordingly, none of the references suggest or teach the surprising benefits and advantages available when practicing the invention disclosed in this specification.

Aqueous phase oxidation employing peroxide is well known and expressly cited in several U.S. patents some of which have already been cited: U.S. Pat. Nos. 4,102,811 (1978), 4,101,444 (1978), 3,562,150 (1971) (not previously cited), 3,379,639 (1968), 3,255,102 (1966), 3,252,918 (1966), 3,201,341 (1965), 3,182,011 (1965), 3,168,462 (1965), 3,146,188 (1964) and 3,122,497 (1964).

BRIEF DESCRIPTION OF THE INVENTION

It is an object of this invention to simplify a process for converting metal contaminants, such as nickel, vanadium, and iron which have been absorbed by a catalyst during conversion reactions of a hydrocarbon feedstock, to a water dispersible form by means of a simplified process which avoids or lessens the cost of costly chemicals such as, for example, acids, chelating agents, or peroxides such as hydrogen peroxide.

It is an object of this invention to regenerate a catalyst to restore its catalytic activity by means of an aqueous phase oxidation employing high partial pressures of oxygen in excess of 10 psig.

It is an object of this invention to restore and/or maintain the activity of a catalyst with aqueous phase treatments which do not adversely affect the activity and other physical properties of the catalyst.

Other objects of this invention are clear to a person of skill in the art based upon the specification.

In a conversion process for a hydrocarbon feed employing a catalyst which at conversion process conditions is capable of facilitating hydrocarbon conversions, e.g., cracking, hydrocracking, hydrofining, reforming and the like, and which catalyst itself picks up at least a portion of the metal contaminants, e.g. nickel, vanadium and iron, contained within the hydrocarbon feed to form a contaminated catalyst, an improved method for restoring the chemical conversion activity of such a contaminated catalyst comprises: contacting a slurry of the contaminated catalyst in a substantially aqueous phase with an oxygen-containing gas, wherein the molecular oxygen partial pressure is in the range of about 10 psig, to about 500 psig., at a temperature in the range of about 40° C. to about 120° C., for a time sufficient both to convert at least a portion of the metal contaminants into a water dispersible material and to extract at least a portion of such water dispersible material from the contaminated catalyst into the aqueous phase. The time necessary for both molecular oxygen oxidation and extraction is not in excess of two hours, and preferably is in the range of one to two hours, but in some instances less than fifteen minutes is sufficient and in many instances five minutes to fifteen produces satisfactory results. In general, the time necessary for both molecular oxygen oxidation and extraction is in the range of about five minutes to two hours, and preferably in the range of about five minutes to about fifteen minutes.

The contaminated catalyst used in the aqueous slurry can be in one of two forms or both. In one form, the contaminated catalyst can have carbonaceous deposits such as arise during a hydrocarbon chemical conversion process. In another, the contaminated catalyst with a carbonaceous deposit, as in the former form, is first regenerated to remove at least a portion of such carbonaceous deposits and then sulfided, as described hereinafter, prior to being added to an aqueous slurry for later oxidation. Optionally, in addition to regeneration, the catalyst can also be calcined prior to sulfiding and incorporation into an aqueous slurry for later oxidation.

DETAILED DESCRIPTION OF THE INVENTION

In more detail, the process for recovering and/or maintaining the catalytic activity of a chemical conversion catalyst comprises in one embodiment removing from a chemical conversion zone an aged catalyst which at least in part has carbonaceous deposits thereon and at least in part contains contaminating metals such as nickel, vanadium, or iron picked up during the conversion of a hydrocarbon feed containing such metal contaminants, subjecting the aged catalyst to an oxidative burn-off to remove at least a portion of these carbonaceous deposits to form a regenerated catalyst, sulfiding the regenerated catalyst to form a sulfided catalyst, forming an aqueous slurry with the sulfided catalyst, contacting the slurry with oxygen-containing gas, wherein the molecular oxygen partial pressure is preferably above about 10 psig., and more preferably above about 15 psig. The temperature of the slurry is sufficient to cause metal contaminants to become dispersed in the liquid aqueous phase and the time that the oxygen treated catalyst remains in the slurry is sufficient to significantly reduce the metal contaminants present in the treated catalyst. The treated catalyst if still wet is preferably dried prior to being introduced into a regeneration reactor or zone. Such drying can be achieved by air. Alternatively, the catalyst can be mixed with a hydrocarbon feedstock to form an oil-catalyst slurry and introduced directly into the chemical conversion zone. Optionally, contacting the aqueous phase oxygen treated catalyst with either an oxidative and/or a reductive wash can be beneficial, wherein the last wash is preferably an oxidative wash, such as disclosed in U.S. Pat. Nos. 4,101,444 (1978) and 4,102,811 (1978) both incorporated herein by reference.

In still another embodiment of this invention, the process for recovering and/or maintaining the catalytic activity of a chemical conversion catalyst comprises removing at least a portion of an aged catalyst containing a carbonaceous deposit thereon from a hydrocarbon conversion zone, forming an aqueous slurry of the aged catalyst, contacting the aqueous slurry with an oxygen-containing gas, wherein the oxygen partial pressure is preferably above about 10 psig. and more preferably above about 15 psig. The temperature of the slurry is sufficient to cause metal contaminants to become dispersed in the liquid aqueous phase and the time that the oxygen treated catalyst remains in the slurry is sufficient to significantly reduce the metal contaminants present in the treated catalyst, and recovering the treated catalyst which can then be transferred back to the chemical conversion zone. Optionally, the treated catalyst can beneficially be contacted with either an oxidative and/or reductive wash, wherein the last wash is preferably an oxidative wash.

Catalytically promoted methods for the chemical conversion of hydrocarbons include cracking, hydrocracking, reforming, hydroforming, etc. Such reactions often are performed at elevated temperatures, for example, about 300° to 1200° F. (149° to 649° C.), more often about 600° to 1000° F. (316° to 538° C.). Feedstocks to these processes comprise normally liquid and solid hydrocarbons which at the temperature of the conversion reaction are generally in a fluid, i.e., liquid or vapor, state.

In particular, cracking of heavier hydrocarbon feedstocks to produce lower boiling hydrocarbons, e.g. of preferred octane rating boiling in the gasoline range, is widely practiced and uses a variety of solid catalysts. Cracking is ordinarily effected to produce gasoline as the most valuable product and is generally conducted at temperatures of about 750° to 1100° F. (399° to 593° C.), preferably about 850° to 950° F. (454° to 510° C.) at pressures up to about 2000 psig., preferably about atmospheric to 100 psig., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Metal contaminants on a hydrodesulfurization (HDS) catalyst can also be removed by the present method. A metal contaminated and deactived HDS catalyst (not requiring any additional sulfiding beyond that produced during an HDS reaction process) is subjected to an aqueous phase oxidation under similar oxidation conditions defined for this process. Metal contaminants can be selectively removed from an HDS catalyst, which is then restored to its HDS catalytic activity. The subsequent reductive wash (with aqueous $SO_2$ solution) and oxidative wash (with a very dilute $H_2O_2$ solution) can also be applied to enhance the metal removal and to improve the catalytic performance.

Solid catalysts have long been recognized as useful in catalytically promoting conversion of hydrocarbons. For cracking processes, the catalysts which have received the widest acceptance today are initially activated or calcined and are predominantly silica or silica-based, e.g., silica-alumina, silica-magnesia, silica-zirconia, etc., compositions in a state of slight hydration and containing small amounts of acidic oxide promoters in many instances. The catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking tends more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatious catalyst, which are more uniform and less damaged by high temperatures in treatment and regeneration, is often preferable. Popular synthetic gel cracking catalysts generally contain about 10 to 30% by weight alumina. Two such catalysts are "Aerocat" which contains about 13% $Al_2O_3$, and "High Alumina Nalcat" which contains about 25% $Al_2O_3$, with substantially the balance being silica. The catalyst can be only partially of synthetic material; for example, it can be made by the precipitation of silica-alumina on clay, such as kaolinite or halloysite. One such semi-synthetic catalyst contains about equal amounts of silica-alumina gel and clay.

Other solid catalysts include cracking catalysts which contain a catalytically effective amount of at least one natural or synthetic zeolite, e.g., crystalline alumino silicate. A preferred catalyst is one that includes at least one zeolite to provide a high activity catalyst. Suitable amounts of zeolite in the catalyst are in the range of about 1–75% by weight, as based on the total weight of the catalyst. Preferred are zeolite amounts of about 2–30% by weight as based on the total catalyst. Catalysts which can withstand the conditions of both hydrocarbon cracking and catalyst regeneration are suitable for use in the process of this invention. For example, a phosphate silica-alumina silicate composition is shown in U.S. Pat. No. 3,867,279, chrysotile catalysts are shown in U.S. Pat. No. 3,868,316 and a zeolite beta type of catalyst is shown in U.S. Pat. No. re 28,341. The catalyst may only be partially of synthetic materials; for example, it may be made by the precipitation of a silica-alumina on clay, such as kaolinite or halloysite.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative processes to which it will be exposed. In a fixed-bed process, a series of catalytic reactors may be used, some being on stream and others in the process of cleaning, regeneration, etc. In circulating catalysts systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermoform" process the catalyst is in the form of beads which are conveyed by elevators. Generally these beads may range in size up to about $\frac{1}{2}$" in diameter. When fresh, the minimum sized bead is generally about $\frac{1}{8}$". Other types of process use the other forms of catalyst such as tablets or extruded pellets.

Regeneration of a catalyst to remove carbon is a relatively efficient procedure in most commercial catalytic conversion operations. For example, in a typical fluidized cracking unit, a portion of catalyst is continually being removed from the reactor and sent to the regenerator for contact with a molecular oxygen-containing gas, such as air, at about 950° to 1400° F. (510° to 760° C.), more usually about 1000° to 1300° F. (538° to 704° C.). Combustion of coke from the catalyst is rapid, and for reasons of economy only enough air is used to supply the needed oxygen. Average residence time for a portion of catalyst in the regenerator can be on the order of about two seconds to about five minutes and the oxygen content of the effluent gases from the regenerator is desirably about 0.1% to about 2%, and more preferably about 0.2% to about 1.5%. The regeneration of any particular quantum of catalyst is generally regulated to give a carbon content of less than about 5.0%, generally less than about 0.5%.

Treatment to calcine the regenerated catalyst with molecular oxygen-containing gas is preferably at a temperature at least about 50° F. (28° C.) higher than the regeneration temperature that is, the average temperature at which the major portion of carbon is removed from the catalyst. The temperature of treatment with molecular oxygen-containing gas will generally be in the range of about 1000° to 1800° F. (538° to 982° C.) but below a temperature where the catalyst undergoes any substantial deleterious change in its physical or chemical characteristics. The catalyst, as pointed out, is in a substantially carbon-free condition during this high-temperature treatment. If any significant amount of carbon is present in the catalyst at the start of this high-temperature treatment, the essential oxgyen content is that continued after carbon removal. In any event, after carbon removal, the oxygen treatment of the essentially carbon-free catalyst is at least long enough to convert a substantial amount of vanadium to a pentavalent state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the vanadium-poisoned catalyst with molecular oxygen-containing gas is preferably performed at a temperature of about 1150° to 1350° F. (621° to 782° C.) or even as high as 1600° F. (871° C.). Little or no effect on vanadium removal is accomplished by treatment at temperatures significantly below about 1000° F. (538° C.), even for an extended time. The upper temperature, to avoid undue catalyst damage, will usually not materially exceed about 1600° to 1800° F. (871° to 982° C.). The duration of the oxygen treatment and the amount of pentavalent vanadium prepared by the treatment for subsequent removal is dependent upon the temperature and the characteristics of the equipment used. The length of the oxygen treatment may vary from the short time necessary to produce an observable effect in the later treatment say, a quarter of an hour to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air. The partial pressure of oxygen in the treating gas may range widely, for example, from about 0.1 to 30 atmospheres, but usually the total gas pressure will not exceed about 25 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen. The treatment is not prolonged to a point where the catalyst will be damaged. The maximum practical time of treatment will vary from about 4 to 24 hours, depending on the type of equipment used.

The sulfiding step can be performed by contacting the poisoned catalyst with elemental sulfur vapors, or more conveniently by contacting the poisoned catalyst with a volatile sulfide, such as $H_2S$, $CS_2$, COS or a mercaptan. The contact with the sulfur-containing vapor can be performed at an elevated temperature generally in the range of about 500° to 1500° F. (260° to 816° C.), preferably about 800° to 1300° F. (427° to 704° C.). Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen, carbon monoxide, or hydrogen. The time of contact can vary on the basis of the temperature and pressure chosen and other factors such as the amount of metal to be removed. The sulfiding can be run for up to about 20 hours or more depending on these conditions and the severity of the poisoning. Temperatures of about 900° to 1200° F. (482° to 649° C.) and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. The sulfiding step performs the function not only of supplying a sulfur-containing metal compound which may be easily converted to the sulfate or other water-soluble form but also appears to concentrate some metal poisons, especially nickel, at the surface of the catalyst particle.

Preferably, the amount of sulfur added to the catalyst is a function of the total metals on the catalyst. For example, it is preferred that the weight percent of sulfur on the catalyst after contacting with the sulfur-containing agent be about 40-75% of the weight percent of the total of nickel, vanadium and iron on the catalyst. Studies have shown that catalysts containing about 1.5 to 2.0 weight percent of these metals should contain about 1.0 to 1.5% sulfur after contacting with a sulfur-containing agent to insure effective metals removal in subsequent steps of the process.

Of critical importance in carrying out the novel process of this invention is that a high partial pressure of oxygen of at least 10 psig. and preferably at least 15 psig. is required in an aqueous phase to optimally oxidize the metal sulfides on the sulfied catalyst so as to promote optimum removal of the water dispersible compounds produced during such oxidation. As used herein, "dispersible" is intended to include minute particle size material, as well as soluble and colloidal size particles. Oxygen partial pressures in the range of about 10 psig. to about 500 psig. can be used. Pressures greater than 500 psig. can be used, but apparatus limitations become the determining consideration.

After converting at least a portion of the metal contaminants on the catalyst, to a removable form, at least a portion of the metal poison is removed by contacting, e.g., washing, the catalyst with a liquid aqueous medium. For example, the catalyst may be washed with an aqueous solution or an acidic aqueous solution such as an aqueous solution of $HNO_3$, $H_2SO_4$, HCl, and the like. The acidity of the wash solution, however, and wash times should be selected to insure that excessive amounts of $Al_2O_3$, if present, are not removed from the catalyst. Preferable acidic aqueous solutions are dilute aqueous solutions having a pH in the range of about 2 to 5.

A preferred washing method utilizes a reductive wash, which is preferably followed by an oxidative wash. The washes may be given alternately or several reductive washes may be followed by several oxidative washes. When alternating washes are used, the final wash is preferably an oxidative wash to leave the catalyst in the best form for hydrocarbon conversion, e.g., cracking. As used herein, "reductive" wash refers to a wash with an aqueous solution containing a reducing agent or an agent which may give up electrons. Similarly, "oxidative" wash refers to a wash with an aqueous solution containing an oxidizing agent or an agent which may accept electrons. Moreover, "wash" refers to a treatment with the solution which may be accomplished by contacting the catalyst with the wash solution for a time sufficient to cause an interaction between the solution and catalyst thereby removing at least a portion of the metal contaminant. The contacting may be a batch operation, a semi-continuous operation or a continuous operation. Thus, a "wash" may include merely stirring in a batch vessel or a complex series of counter current contactors or continuous contactors.

A preferred reductive wash medium comprises a solution of sulfur dioxide or compounds capable of producing sulfur dioxide such as bisulfite and/or sulfite salts in an acidic aqueous medium. Other reducing agents which may be used include hydrogen, carbon monoxide, hydrogen sulfide, oxalic acid or salts thereof, hydrazine and hydrazine derivatives, borane, diborane, borohydrides, metallic aluminum hydrides, sulfites, thiosulfates, dithionites, polythionites and the like. Sulfur dioxide is preferred since it provides sufficient temporary acidity without risking substantial alumina removal, it provides sufficient reducing power and it produces stable anions containing sulfur and oxygen to keep the removed metals in soluble form. Reductive washes with sulfur dioxide are preferably effected at conditions to inhibit oxidation of the $SO_2$, e.g., in the essential absence of added free molecular oxygen. In addition, reductive washes with $SO_2$ provide for improved solubility of elemental sulfur which may have been deposited on the catalyst during contact with the sulfur-containing agent. Such elemental sulfur deposited on the catalyst can act to reduce the degree of demetallization produced from the present process. Therefore, solubilization of such sulfur is an additional benefit of a reductive wash with $SO_2$. By way of example of a preferred reductive wash, an aqueous solution saturated with sulfur dioxide to form a sulfur oxide hydrate (i.e. $SO_2 \cdot xH_2O$) is prepared at about 0°–20° C. preferably about 5°–15° C., by bubbling $SO_2$ through water. An aqueous, e.g., about 10–50% and preferably about 15–25% by weight catalyst slurry in water is prepared and heated to a temperature of about 60°–95° C., preferably 65°–80° C. The $SO_2$ saturated solution is then added to the catalyst slurry in an amount sufficient to give an initial pH of the system in the range of about 2.0 to about 3.5 and preferably about 2.5 to 3.0. Preferably, about 0.1 to about 10 volumes of $SO_2$ saturated solution per volume of catalyst are used during the wash. After the contacting has occurred for about 0.5–10 minutes, preferably about 1–5 minutes, preferably under an inert atmosphere, the demetallized catalyst can be separated, e.g., by filtration or decanting. Long contact times, i.e., in excess of about 10 minutes, are preferably avoided to minimize metals redeposition on the catalyst and to avoid oxidation of the $SO_2$ should the wash be effected in a manner where air and oxygen are not intentionally excluded. This reductive wash step can be followed by a water wash.

As indicated, the reductive wash is preferably followed by an oxidative wash. A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxyheptyl peroxide, cyclohexanone peroxide, tertiary butyl peracetate, di-tertiary butyl diperphthalate, tertiary butyl perbenzone, methyl ethyl hydroperoxide, di-tertiary butyl peroxide, p-methyl benzene hydroperoxide, pinane hydroperoxide, 2,5-dimethylhexane-2,5-dihydroperoxide, cumene hydroperoxide and the like; as well as organic peracids such as performic acid, peracetic acid, trichloroperacetic acid, perchloric acid, periodic acid, perbenzoic acid, perphthalic acid and the like including salts thereof. Ambient oxidative wash temperatures can be used, but temperatures of about 150° F. to the boiling point of the aqueous solution in combination with agitation are helpful in increasing dispersibility or removability of the metal poisons. Preferred temperatures are about 65° to about 95° C. Pressure above atmospheric may be used but the results usually do not justify the additional equipment. Contact times similar to the contact times for the reductive wash such as from about several seconds to about half an hour are usually sufficient for removal of metal contaminants.

As indicated, preferably, the reductive wash is followed by a hydrogen peroxide-water oxidative wash. The hydrogen peroxide solution preferably containing about 2 to 30 weight % hydrogen peroxide, can be added to an aqueous catalyst slurry as described earlier at about 65°–95° C., preferably 60°–85° C. and allowed to react for a time sufficient to solubilize at least a portion of the metal contaminants. Preferred wash times are about 1–5 minutes. If contact times are unnecessarily prolonged, solubilized species can decompose and redeposit on the catalyst. A concentration of $H_2O_2$ in the range of about 5–50 lb., preferably about 10–20 lb. of $H_2O_2$/ton of catalyst is preferably used. Additional oxidative washes can be used to ensure efficient removal of metal and the restoration of catalytic properties. In addition, the oxidative washing can be carried out either in the presence of or absence of a mineral acid such as HCl, $HNO_3$ or $H_2SO_4$. Preferably the pH of the oxidative wash medium is about 2 to about 6. Alternating catalyst washing using reductive and oxidative solutions can be used. If alternative washes are used, it is preferred that the last wash be an oxidative wash.

After the catalyst is washed, the catalyst slurry can be filtered to give a cake. The cake may be reslurried one or more times with water or rinsed in other ways, such as, for example, by a water wash of the filter cake.

After the washing and rinsing treatment which may be used in the catalyst demetallization procedure, the catalyst is transferred to a hydrocarbon conversion system, for instance, to a catalyst regenerator. The catalyst may be returned as a slurry in the final aqueous wash medium, or it may be desirable first to dry the catalyst filter cake or filter cake slurry at, for example, about 215° to 320° F., under a vacuum. Also, prior to reusing the catalyst in the conversion operation it can be calcined, for example, at temperatures usually in the range of about 700° F. to about 1300° F. The catalyst may also be slurried with hydrocarbons and added back to the reactor vessel, if desired.

A fluidized solids technique is preferred for the vapor contact processes used in any selected demetallization procedure as a way to shorten the time requirements. If desired, additional metals removal may be obtained by repeating the demetallization sequence or using other known treatment processes. Inert gases frequently may be employed after contact with reactive vapors to remove any of these vapors entrained in the catalyst or to purge the catalyst of reaction products.

The catalyst to be treated may be removed from the hydrocarbon conversion system—that is, the stream of catalyst which, in most conventional procedures is cycled between conversion and regenerating operations—before the poison content reaches about 100,000 ppm, the poisoning metals, e.g., nickel, vanadium and iron, being calculated as elemental metals. Generally, at least about 5,000 to about 20,000 ppm. metals will be accumulated on the catalyst before demetallization is warranted. The treatment of this invention is effective despite the presence of a small amount of carbonaceous material on the treated catalyst, but preferably catalyst regeneration is continued until the catalyst contains not more than about 0.5% carbonaceous material.

The amount of nickel, vanadium, iron and/or copper removed in practicing the procedures outlined or the proportions of each may be varied by proper choice of treating conditions. It may prove necessary, in the case of very severely poisoned catalyst, to repeat the treatment to reduce the metals to an acceptable level, perhaps with variations when one metal is greatly in excess. A further significant advantage of the process lies in the fact that the overall metals removal operation even if repeated, does not unduly deleteriously affect the activity, selectivity, pore structure and other desirable characteristics of the catalyst. Any given step in the demetallization treatment is usually continued for a time sufficient to effect a meaningful conversion or removal of poisoning metal and ultimately results in a substantial increase in metals removal compared with that which would have been removed if the particular step had not been performed. Generally, a process with at least one of a reductive or an oxidative wash will provide additional reduction in nickel, vanadium and iron. Such processing preferably provides about 70–90 weight % reduction in nickel, about 30–70 weight % reduction in vanadium and about 30-70 weight % reduction in iron when the catalyst initially contains as much as about 0.1 to 0.5 weight % nickel, about 0.3 to 1.0 weight % vanadium and about 0.2 to 1.2 weight % of iron.

In practice, the process of the present invention can be applied by removing a portion of catalyst from the regenerator or regenerator standpipe of a hydrocarbon conversion unit, e.g., cracking system, after a standard regeneration treatment to remove at least a portion of the carbonaceous material from the catalyst, converting the metals to a metal sulfur containing compound, cooling and oxidizing the catalyst, slurrying the catalyst for a reductive wash, filtering, and reslurrying the catalyst for an oxidative wash, filtering and rinsing with water. The treated catalyst can be returned to the unit, for example, to the regenerator or slurried in hydrocarbons to be returned to the reactor.

The examples contained hereinafter are intended to be illustrative only. Variations on the examples are readily apparent to one skilled in the art and are intended to be included within the scope of the invention.

EXAMPLE

This example compares the effectiveness of an air oxidation or some peroxide aqueous phase oxidations of sulfided catalysts to aqueous phase oxidations employing partial pressures of oxygen above 10 psig.

A Phillips Borger equilibrium silica-alumina zeolite-containing catalyst having an MA of 80, a CPF of 0.75 and an $H_2/CH_4$ of 8.0 was contaminated and poisoned by use in a pilot plant operation wherein a petroleum gas oil stock containing nickel, vanadium and iron was catalytically cracked.

The poisoned and carbonaceous coated catalyst was regenerated by conventional techniques. The regenerated catalyst contained less than 0.5% by weight carbon, 0.29% by weight Ni, 0.78% by weight of Fe, and 0.73% by weight of V. The microactivity (MA) was 59.1, the CPF was 3.01, and the $H_2/CH_4$ ratio was 20.2.

The regenerated catalyst was sulfided by first heating to 1350° F. (732° C.) with an accompanying nitrogen purge. Hydrogen sulfide-containing gas was then added for four hours in an amount equal to 0.28 weight percent of the catalyst/minute. The hydrogen sulfide-containing gas contained $H_2S$ and $N_2$ wherein the volume ratio of $H_2S$ to $N_2$ ratio was in the range 100-20:0-80. The sulfided catalyst was cooled and found to contain 1.15% by weight of sulfur.

The sulfided catalyst containing metal contaminants was then oxidized by two different methods: the first was an aqueous phase oxidation under various partial pressures of $O_2$ which was bubbled through the slurry, and the second, an aqueous phase oxidation wherein the concentration of $H_2O_2$ to catalyst was 90 pounds of $H_2O_2$ to 2000 pounds of catalyst.

Optionally, an $SO_2$ wash followed the oxidation of the sulfided catalyst and in some instances an $H_2O_2$ wash was also used. An $SO_2$ wash involves slurrying a catalyst (previously regenerated, sulfided, and aqueous phase oxidized), for about three minutes as a 20% by weight aqueous slurry. The slurry at 158° F. (70° C.) contained a sufficient amount of $SO_2$ to give an initial pH of 2.0. The catalyst was filtered and washed free of the $SO_2$ wash. An $H_2O_2$ wash involves forming a 10 to 15% by weight solids slurry of a catalyst (previously treated in an $SO_2$ wash) wherein $H_2O_2$ was added at a rate of about 5-20, and preferably 10-20 lbs./ton of catalyst in the slurry. The pH was initially about 2.8-3.3 and the temperature was about 176° F. (80° C.). The contact time with the aqueous $H_2O_2$ containing slurry was about three minutes. The catalyst was filtered, washed free of $H_2O_2$ and dried at about 182°-320° F. (100°-160° C.).

The results of these process steps are reported in the following table.

| % S | Oxidation | *Washes | Temperature °C. | **Time Minutes | % Metal Removal Ni/Fe/V/S | Catalytic Activity MA/CPF/$H_2$/$CH_4$ |
|---|---|---|---|---|---|---|
| 1.16 | $H_2O_2$, 90#/ton | 0 | 75° | 8 | 90/68/60/80 | 75.2/1.03/5.35 |
| 1.15 | $O_2$, 1 psig | 2 | 85° | 60 | 14/5/1/47 | |
| 1.41 | $O_2$, 15 psig | 2 | 70° | 55 | 86/50/67/91 | |
| 1.46 | $O_2$, 60 psig | 2 | 85° | 30 | 92/58/61/87 | 75.0/1.11/6.89 |
| 1.16 | $O_2$, 400 psig | 2 | 100° | 10 | 86/59/56/80 | 74.9/1.16/7.62 |
| 1.16 | $O_2$, 400 psig | 0 | 75° | 10 | 14/5/0/28 | |
| 1.16 | $O_2$, 400 psig | 1 | 75° | 10 | 28/23/13/38 | |
| 1.16 | $O_2$, 400 psig | 2 | 75° | 10 | 57/35/13/69 | |
| 1.16 | $O_2$, 400 psig | 0 | 150° | 10 | 54/36/15/72 | |
| 1.16 | $O_2$, 400 psig | 1 | 150° | 10 | 54/51/38/74 | |
| 1.16 | $O_2$, 400 psig | 2 | 150° | 10 | 86/51/40/87 | |
| 1.16 | $O_2$, 20 psig | 0 | 150° | 10 | 14/12/3/- | |
| 1.16 | $O_2$, 20 psig | 2 | 150° | 10 | 61/35/18/71 | |
| 1.16 | $O_2$, 20 psig | 0 | 75° | 10 | 14/19/1/24 | |
| 1.16 | $O_2$, 20 psig | 1 | 75° | 10 | 25/17/9/35 | |
| 1.16 | $O_2$, 20 psig | 2 | 75° | 10 | 57/25/9/73 | |
| 1.15 | Air, 1 atm | 0 | 350°-380° | 30 | 0/0/0/45 | |
| 1.15 | Air | 2 | " | | 82/45/40/85 | 75.6/1.24/8.60 |

*Washes involve solutions of $SO_2$ and $H_2O_2$. If no wash was used a "O" appears in the column headed "WASHES"; If an $SO_2$ wash was used and no other, then a "1" appears therein; and if both an $SO_2$ wash followed by an $H_2O_2$ wash was used then a "2" appears therein.
**Time is the length of time in minutes that the sulfided catalyst was subjected to the oxidation process indicated under the conditions specified in the column headed "OXIDATION".
***The aqueous phase oxidation is carried out three times, 8 minutes each at 20% by weight of solids in an aqueous slurry.

The embodiments of this invention in which an exclusive property or privilege is claimed are defined as follows:

1. A process for maintaining the catalytic activity of a chemical conversion catalyst comprising:
   (a) removing from a chemical conversion zone a catalyst which at least in part has carbonaceous deposits thereon and at least in part contains contaminating metals picked up during the conversion of a hydrocarbon feed containing such metal contaminants;

(b) regenerating said catalyst to remove at least a portion of said carbonaceous deposits to form a regenerated catalyst;

(c) sulfiding said regenerated catalyst to form a sulfided catalyst containing sulfur compounds of at least a portion of said contaminating metals;

(d) contacting an aqueous slurry comprising said sulfided catalyst with an oxygen-containing gas, wherein the molecular oxygen partial pressure is above about 10 psig. at a temperature and for a time sufficient to permit at least a portion of the metal contaminants to transfer from said sulfided catalyst into the aqueous portion of said aqueous slurry to produce a catalyst having a reduced content of metal contaminants.

2. The process of claim 1 wherein sulfiding is continued until the weight percent of sulfur on said sulfided catalyst is in the range of about 40 to 75% of the weight percent of the total metal contaminants on the catalyst.

3. The process of claim 1 wherein regenerating said catalyst comprises contacting said catalyst with a molecular oxygen-containing gas at about 950° F. to 1400° F.

4. The process of claims 1, 2, or 3, wherein said catalyst having a reduced content of metal contaminants is contacted with alternate reductive and oxidative washes, the last of said washes comprising an oxidative wash.

5. The process of claim 4 wherein the reductive wash medium is an aqueous reductive wash medium.

6. The process of claim 5 wherein the reductive aqueous wash medium is a solution of $SO_2$ in water.

7. The process of claim 4 wherein the oxidative wash medium is an aqueous oxidative wash medium.

8. The process of claim 7 wherein said aqueous oxidative wash medium is a solution of $H_2O_2$ in water.

* * * * *